(12) United States Patent
Jahromi et al.

(10) Patent No.: US 8,318,276 B2
(45) Date of Patent: Nov. 27, 2012

(54) SUBSTRATES WITH BARRIER PROPERTIES AT HIGH HUMIDITY

(75) Inventors: Shahab Jahromi, Maastricht (NL); Constantinus Simon Maria Liebregts, Helmond (NL)

(73) Assignee: DSM IP Assets B.V., Heerlen (NL)

( * ) Notice: Subject to any disclaimer, the term of this patent is extended or adjusted under 35 U.S.C. 154(b) by 588 days.

(21) Appl. No.: 12/522,830

(22) PCT Filed: Jan. 4, 2008

(86) PCT No.: PCT/EP2008/000035
§ 371 (c)(1),
(2), (4) Date: Nov. 12, 2009

(87) PCT Pub. No.: WO2008/083934

PCT Pub. Date: Jul. 17, 2008

(65) Prior Publication Data
US 2010/0178440 A1  Jul. 15, 2010

(30) Foreign Application Priority Data

Jan. 11, 2007 (EP) .................................... 07000505
Jan. 29, 2007 (EP) .................................... 07001827
May 24, 2007 (EP) .................................... 07010342

(51) Int. Cl.
*B29D 22/00* (2006.01)
*B29D 23/00* (2006.01)
*B32B 1/08* (2006.01)

(52) U.S. Cl. ... 428/35.7; 428/34.1; 428/335; 428/411.1; 428/457; 428/480; 428/523; 428/688; 106/287.21; 524/100; 528/252

(58) Field of Classification Search .................. 428/335, 428/411.1, 426, 457, 480, 523, 688, 35.7, 428/34.1; 106/287.12; 524/100; 528/252
See application file for complete search history.

(56) References Cited

U.S. PATENT DOCUMENTS 6,632,519 B1   10/2003   Jahromi et al.

OTHER PUBLICATIONS

International Search Report for PCT/EP2008/000035 mailed Jun. 16, 2008.
Written Opinion of the International Searching Authority mailed Jun. 16, 2008.

*Primary Examiner* — Michael C Miggins
(74) *Attorney, Agent, or Firm* — Nixon & Vanderhye P.C.

(57) ABSTRACT

The invention relates to a substrate comprising a layer of crystalline triazine with a protective compound having a retention of oxygen barrier at 85% RH of about 50% or better. The protective compound preferably contains an azine-formaldehyde or phenol-formaldehyde resin, preferably with an hydroxy-functional polymer, and is cured.

13 Claims, No Drawings

SUBSTRATES WITH BARRIER PROPERTIES AT HIGH HUMIDITY

This application is the U.S. national phase of International Application No. PCT/EP2008/000035 filed 4 Jan. 2008, which designated the U.S. and claims priority to EP Application No. 07000505.3 filed 11 Jan. 2007; EP Application No. 07001827.0 filed 29 Jan. 2007; and EP Application No. 07010342.9 filed 24 May 2007, the entire contents of each of which are hereby incorporated by reference.

The invention relates to substrates with good barrier properties at high humidity.

In a number of industries, barrier properties with respect to e.g. oxygen transmission are important. For example in the food and feed industry, oxygen barrier is important to preserve food and feed products. In the display industry, also high oxygen barrier is important to protect oxygen sensitive chemical compounds. For both applications, the barrier properties of single thin layer plastics are generally insufficient. Hence, so-called barrier layers are applied on these substrates in order to improve these. Often, the substrates are films, but it may equally be three dimensional shapes like bottles.

Currently, substrates with good barrier properties at high humidity are well known in the art. Commonly used are plastic films with an alumina layer. These products have as disadvantage that these are difficult to recycle, the content of a package is not visible and cannot be micro waved. As alternative, SiOx or AlOx layers are used on films. However, these have as disadvantage that a high investment is necessary, because the application technology is very complicated. For any of these applications, polypropylene film substrates have to be specially adapted, as the temperature may raise during application, or to improve adhesion, which limits the possible substrates. Furthermore, the SiOx and AlOx coatings are very brittle, which limits their use.

Hence, there is a need for an alternative transparent barrier layer, which has good barrier properties at high humidity, which is easy to apply on a variety of substrates, and acceptable in recycling and which has better mechanical properties.

This problem now is solved by providing a substrate comprising a layer of crystalline triazine with a protective compound having a retention of oxygen barrier at 85% RH of 50% or better.

In a preferred embodiment, the protective compound is a compound that can react with the crystalline triazine. In a further preferred embodiment, the compound that can react with the crystalline triazine is reacted to a sufficient extent that suitable properties at high humidity are achieved.

Preferably, the retention is 80% or better, more preferably 90% or better, and most preferably 95% or better. The OTR of the carrier measured at 0% RH without crystalline triazine layer minus the OTR at 0% RH of the carrier with crystalline triazine layer is taken as 100%. The percentage then is calculated by the OTR at 85% RH minus the OTR at 0% RH. The measurement is done at 23° C. Unexpectedly, the OTR value is even lower when measured at 40° C. From this, it is clear that the barrier films are very effective also under high humidity.

Preferably, the triazine layer causes a reduction in OTR to about ⅓ or better of the OTR without triazine barrier layer measured at 0% RH. Even more preferred, the crystalline triazine layer causes a reduction in OTR of about ⅕ or better of the OTR without the triazine layer, and even more preferred of about ⅛ or better. The absolute values depend on the type and thickness of substrate, and can vary over a wide range.

Crystalline triazine layers, like for example crystalline melamine layers, have been described as barrier layer for lowering oxygen transmission or carbon-dioxide transmission through substrates of plastic, such as of polypropylene or polyethylene-terephthalate (see e.g. U.S. Pat. No. 6,632,519, WO2004/101662 or WO2004/101843). Although the oxygen transmission is indeed reduced substantially at low humidity, the improved barrier properties disappear when measured at 85% RH.

It is a further object of the invention, to provide a crystalline triazine layer with barrier properties that are substantially retained at 85% RH.

The inventors now furthermore have found a substrate comprising a layer of crystalline triazine with a cured azine-formaldehyde or phenol-formaldehyde resin.

Preferred embodiments of such resins are described below.

In a preferred embodiment, the crystalline triazine layers is used as 'single' barrier layer, because that gives a relatively easy to apply, transparent recyclable barrier film.

However, there is a further need in industry to have further improved barrier properties.

In another preferred embodiment of the invention, the crystalline triazine resin is used as top coat on a alumina or metal-oxide barrier layer to both improve barrier properties, and to protect the alumina or metal-oxide layers. On the crystalline triazine layer a further protective compound is applied to keep the barrier properties at high humidity.

The barrier films preferably are able to be subjected to a variety of further process steps, which may comprise a large set of processing conditions. For example, a substrate with high barrier properties generally is laminated on a further plastic film. The laminating conditions comprise e.g. solvent lamination, extrusion lamination, or dispersion (water based) lamination. Extrusion lamination generally takes place at 200-400° C. Further, the substrate generally is printed with e.g. a text, pictures, or an even color. The printing may be done on the further film, but it is often preferred to print on the film with barrier properties, as that film is thicker, and hence can better resist printing pressure. Several printing techniques exist, such as soft and hard roll printing; using solvent, water, or UV-curable inks. A bare crystalline triazine layer can withstand a number of these processing conditions, but not all. In particular water based adhesives or inks are detrimental, as the very thin layer of triazine can dissolve in water or alcohol. Further, extrusion lamination may—in particular at higher temperatures—cause the triazine to sublimate. A large mechanical impact by a hard-roll printer may cause reduced barrier properties. In a number of applications, the barrier films are used as such (optionally after printing), and sealed to each other, or to a substrate.

It is a further object of the invention to provide a crystalline triazine layer that can withstand a large variety of processing conditions.

The inventors now furthermore have found a substrate with a layer of crystalline triazine further having a cured resin, which resin before cure comprised an azine-formaldehyde or phenol-formaldehyde resin.

In one embodiment of the present invention, the cured resin forms a coating, more preferably a protective coating.

In another embodiment of the present invention, the cured resin functions as an adhesive layer in a laminate.

Preferably, the resin further comprises a film forming polymer.

The film forming polymer may be cross-linkable or substantially non-reactive. Preferably, the polymer is cross-linkable.

In one preferred embodiment of the invention, the polymer is able to react with the azine-formaldehyde or phenol-formaldehyde resin.

In another preferred embodiment of the invention, the resin comprised a further crosslinker able to react with the film forming polymer and preferably also with the azine or phenolic resin.

In a preferred embodiment of the invention, the substrate with barrier properties is sealable.

In another preferred embodiment, the substrate with barrier properties substantially retains its barrier properties upon printing. For example, the substrate comprising a layer of crystalline triazine with a protective compound has a retention of oxygen barrier upon printing of 70% or better, preferably of 90% or better. The retention being defined analogous to the retention at high humidity.

The present invention further relates to a process for making substrates with barrier properties by
a) providing a substrate
b) applying a crystalline triazine layer
c) applying a resin composition
d) at least partly curing the resin composition
to obtain a substrate with a crystalline triazine layer and a cured resin.

In a preferred embodiment, the present invention further relates to a process for making laminates with barrier properties comprising
a) providing a first film substrate
b) optionally providing a layer of alumina, or metal-oxide
c) applying a crystalline triazine layer
d) applying a resin composition
e) at least partly curing the resin composition
and applying a further film after step d or e, or applying a film with a resin composition as step (d), to obtain a laminate with at least a crystalline triazine layer and a cured resin.

The present invention furthermore relates to the use of azine-formaldehyde or phenol-formaldehyde resins for the protection of crystalline triazine barrier layers.

In another embodiment, the present invention relates to containers from plastic, like for example bottles or casks from e.g. polyethylene terephthalate (PET), polyethylene (PE) or polypropylene (PP) with improved gas barrier properties. The invention furthermore relates to a process and apparatus for making such containers.

Non-treated plastic containers like PET, PP or PE bottles have reasonable gas-barrier properties, for example oxygen or carbon-dioxide barrier properties. However, if the content of the bottle is very sensitive to gas permeation, such as for example oxygen sensitive, like fruit-juice or beer, the barrier properties are insufficient. Equally, carbonated soft drinks and beer need a type of bottle that has good barrier properties towards the carbon-dioxide gas. At present, plastic containers like bottles are in use, but the contents generally have (very) limited storage stability.

A number of ways have been suggested to improve the gas barrier like oxygen barrier properties. However, there is a need for plastic containers with improved oxygen transmission properties, without the drawback of the solutions suggested by the prior art.

The present inventors have found a way to improve the gas barrier properties which does not have such drawbacks. The present inventors found a way to have plastic containers with good gas barrier properties which can be recycled, are transparent, and can be used in a process with pasteurisation.

According to the present invention a plastic container comprises a layer of crystalline triazine, and a further thermosetting coating that protects the triazine layer.

Azine resins are known in the art. Examples of azines include urea; melamine, benzguanamine and glycouril, which optionally can be partly alkylated. Phenol is well known, and phenol-formaldehyde resins can be made with phenol, alkylphenols, bisphenols, chlorinated phenols and the like.

In one embodiment of the invention, it is preferred to use an azine resin, as these resins generally are water-white, so no color is caused by the coating. Preferred azines are melamine, urea and mixtures of these. In a preferred embodiment of the invention, the azine resin comprises hexamethylolmelamine, or alkylated derivatives therefrom like hexamethylmethylolmelamine.

The azine or phenol resins are made by reacting formaldehyde with the azine or phenol. Generally, the reaction is performed in water, more in particular a water/formaldehyde mixture. As water is not a preferred solvent for use in the coating of the crystalline triazine, it is preferred to remove substantially all the water, and use the resin as 100% solid, or replace water with another solvent. It is in particular preferred, to use alkoxylated azine or phenol resins. In these resins part, or all of the methylol groups are etherified with an alcohol, generally a primary alcohol. In one embodiment of the invention the methylol groups are only partially etherified, as such resins can be more reactive, which is in particular an advantage for low-temperature curing on heat sensitive substrates.

In a preferred embodiment, the azine- or phenol-formaldehyde resins are substantially 100% solid, or dissolved in non-water solvents.

In a further preferred embodiment, the azine- or phenol-formaldehyde resins are partially etherified with an alkylalcohol compound. Preferably, the alkylalcohol compound has 1-24 carbon atoms, preferably 1-12, and most preferably 1-4 carbon atoms. Examples of alkylalcohol compounds include, but are not limited to, methanol, ethanol, 1-propanol, 2-propanol, n-butanol, 2-butanol, i-butanol, t-butanol, n-pentanol, cyclohexanol, dodecanol and the like.

As solvent in the resin composition, the common solvents can be used. It is preferred to have a low amount of water in the solvent. Preferably, the amount of water in the solvent is about 4 wt % or less, preferably about 1 wt % or less. It is furthermore preferred to have the amount of alcohol compound low as well.

Preferably, the amount of alcohol compound is about 20 wt % or less, preferably, about 10 wt % or less. Generally, some alcohol compound will be present as solvent for the alkylated formaldehyde resin and/or as solvent for catalysts and the like.

Preferably, the solvents comprise hydrocarbon based solvents. Suitable hydrocarbon based solvents include; xylene, ethylbenzene, naphta-cuts, toluene, n-hexane, octane and the like. Other suitable solvents include esters like ethyl-acetate, methoxy-propylacetate, diethyl-ester of butanedicarboxylic acid, ketones like ethyl-methylketone, acetone and the like. However, esters and ketones my be less preferred as they may adversely effect the triazine layer. The esters and ketones preferably are present in about 20% of the solvent or less, more preferably about 10 wt % of the solvent or less.

Preferably no solvent is used, or if a solvent is used, preferably, hydrocarbon based solvents like aromatic or aliphatic solvent is used for about 50 wt % or more, preferably for about 70% or more, and most preferably about 85% or more.

The azine or phenolic resin (the preferably etherified azine-formaldehyde or phenol-formaldehyde resin) can be used as such, preferably with a catalyst. In this case, about 90 wt % or more of the resin composition is the azine or phenolic resin.

In a preferred embodiment of the invention, a further polymer is used with the azine or phenol resin. This polymer may be a crosslinkable resin; or non-crosslinkable polymer.

In a preferred embodiment, the amount of azine or phenolic resin is about 3 wt % or more of the resin composition (the organic solids), preferably about 5 wt % or more, more preferably about 8 wt % or more, and even more preferably about 15 wt % or more. If another polymer is present, it is preferably present in about 10 wt % or more, preferably about 30 wt % or more, and even more preferably about 50 wt % or more.

In one embodiment of the invention, the further polymer is a polyester, polyether, acrylic polymer, polycarbonate, polyhydrocarbon or mixtures and/or copolymers of these. Suitable examples of such polymers include, but are not limited to, alkyd and modified alkyd resins; modified alkyd being acrylated or epoxydized alkyds, saturated polyester; acrylic modified polyester; acrylic resin, polyethers (like polyethyleneoxide; polypropyleneoxide, polytetrahydrofuran, poly(methyl)tetrahydrofuran, ethyleneoxide-butyleneoxide copolymers, ethylene-oxide-propyleneoxide copolymers); polycarbonate; PC—PPO copolymers; TMP-tri/hexa-caprolacton; alkoxylated pentaerytritol, ethoxylated BPA, acrylamide resin; OH-functional acrylic resins; epoxy-esters; epoxy functional phenolic resin or polyester-phenolic resin; hydroxylated polybutylene, hydroxylated C9 resins, hydroxylated C5-resins, and maleic acid anhydride grafted hydrocarbon resins. Further, polymers based on natural materials like cellulose oligomers can be used.

Preferably, the number average molecular weight of the further polymer is about 50000 or lower, preferably about 20000 or lower, and about 500 or higher, preferably about 1000 or higher.

Preferably, the further polymer has reactive groups and can form a cross-linked network. In one embodiment of the invention, the further polymer is reactive with the azine or phenolic resin. Preferably, the further polymer has reactive hydroxyl groups. Preferably, the hydroxyl value is about 3 or higher, preferably about 20 or higher. Generally, the OH-value will be about 200 or lower, preferably about 150 or lower. Generally, the acid value will be about 50 or lower, preferably about 10 or lower.

Suitable examples of non-crosslinkable resins are for example acrylic resins, methyl-cellulose, hydrocarbon resins (tackifyers), and the like.

As additives, the resin composition may comprise stabilizers, flow-agents, wetting agents, shielding agents, coloring agents, anti-blocking agents, adhesion promoters, anti-static agents, anti-fouling agents like fluorinated materials, silicon fluids, acrylic polymers, tackiness agents to make film sealable and the like. These additives generally will constitute about 0.1 wt % or more of the resin composition, often about 1 wt % or more. Generally, the amount will be about 20 wt % or less, preferably about 10 wt % or less.

The resin composition may further comprise fillers, or solid additives, like nanoparticles, clay, silicon, antistatic, carbon, AlOx for hardness and the like. The solid additives are not added in the calculations on resin, solvent and the like, as these particles are largely non-reactive. The amount of solid additives may be about 5 wt % or more, preferably about 10 wt % or more, and can be as high as 200% by weight or less relative to the amount of resin, preferably about 100% by weight or less.

The resin composition preferably contains a catalyst to increase the cure speed and/or to lower the curing temperature.

In one embodiment, the resin composition comprises sufficient catalyst to achieve suitable cure for the azine or phenolic resin at 120° C. within 10 min. Preferably, the cure is sufficient at 120° C. in about 5 min or less. This embodiment is for example suitable if a PET carrier is used.

In another embodiment, the resin composition comprises sufficient catalyst to achieve suitable cure at 70° C. within 20 min, preferably within 10 min, and more preferably within 5 min. This embodiment is for example suitable if a PP carrier is used.

In another embodiment of the present invention, the resin composition comprises compounds for a dual cure. For example, the resin may be cured with UV light with if the resin contains ethylenically unsaturated constituents, and with heat, to cure the azine or phenolic formaldehyde resin. Alternatively, part of the hydroxyl-functions may be crosslinked with isocyanate, and another part with heat, to cure the azine or phenolic formaldehyde resin. Alternatively, part of the compounds may be cured through an acid/epoxy or amine/epoxy reaction, and the other part by with heat, to cure the azine or phenolic formaldehyde resin. A dual cure mechanism may be particularly advantageous if the resin composition is used as the adhesive for the second film.

Generally, the viscosity of the resin composition at 23° C. will be about 0.1 Pa·s or higher, preferably about 1 Pa·s or higher. Generally, the viscosity will be about 50 Pa·s or lower, preferably about 10 Pa·s or lower as measured on a viscosimeter.

The resin composition can be applied with a gravure coater or by other known means. Preferably, the resin composition is applied at a thickness of about 100 nm or more, preferably about 1 µm or more. Generally, the thickness will be about 100 µm or less, preferably about 10 µm or less. Suitable thickness can be for example 1.5, 2, 3 or 4 µm.

Curing can be achieved by heating the substrate with the resin composition in an oven, or by infra-red irradiation.

In one embodiment of the invention, the protective coating is post-cured on the carrier at 20-60° C.; as the methylol-etherification reaction proceeds to further cure at these temperatures.

In a further embodiment of the present invention, the laminate comprises a crystalline triazine layer on a plastic film, which is protected by a cured resin composition, and which has an adhesive layer between the protective layer and a further plastic film.

In a further embodiment, the laminate comprises a pattern or figure on the cured resin that protects the crystalline triazine layer.

In a further embodiment, a film is directly extruded on the protected crystalline triazine layer, which may be printed.

In a further embodiment, the invention relates to a packaging comprises a PET substrate, crystalline triazine layer which is protected with a reactive compound, a poly-olefin layer, paper or cardboard layer and a further polyolefin layer.

In a further embodiment, the invention relates to a laminate being a retortable laminate, comprising plastic layers independently chosen from PP, PET and Polyamide, a crystalline triazine layer and a protective compound. The laminate further will comprise an adhesive which is suitable to withstand retorting conditions. The adhesive may comprise the protective compound, or the laminate may comprise a protective coating and a retortable adhesive.

The thickness of the crystalline triazine layer as formed on the substrate in the vapour-depositing step depends on its intended purpose, and can thus vary within wide limits. Preferably, the thickness of the layer is about 100 µm or less, more preferably about 10 µm or less, and even more preferably about 1 µm or less as with such lower thickness the transparency is improved. The thickness may be for example about 500 nm or less for cost reasons. The minimum thickness is preferably about 2 nm or more, more preferably about 10 nm or more, and even more preferred about 100 nm or more as such thickness improves the protective properties. For example, the thickness can be about 200 or 300 nm or more.

The crystalline triazine layer according to the invention may comprise in principle, any triazine compound, for example melamine, melam, melem, or melon or mixtures thereof. Preferably, the triazine compound is melamine. In a further preferred embodiment, the crystalline triazine is a mixture of melamine and melam, as such a mixture further improves the resistance against water. Such a mixture can contain 10-40 wt % of melam, and 90-60 wt % of melamine.

Preferably the substrate with the crystalline triazine layer, when laminated at the side of the crystalline triazine layer with an adhesive and a plastic film is able to exhibit a lamination strength of about 2.5N/inch or more, more preferably of about 3N/inch or more, even more preferably of about 3.5N/inch or more as measured with a tensile testing apparatus at 30 mm/min and at 90 degree. Generally, the upper limit of the lamination strength is not critical, but generally, this will be about 20 N/inch or less. The lamination of the substrate with crystalline triazine for testing preferably is done with an appropriate urethane adhesive and laminated with a 10 µm thin polyethylene film. Thereafter, the lamination strength of the two films can be measured, and the failure mode can be observed. An appropriate adhesive is an adhesive that has such adhesion strength that the failure mode is not observed on the adhesion layer. The adhesion may be so high that the plastic film breaks. The value of the force necessary to break a film can in that case be taken as value for adhesion.

The substrate comprises a material that serves as carrier, and this generally will be a plastic or paper in the form of a film or web.

Flexible packaging materials generally are based on film or sheet like materials, herein named film.

The substrate with protected triazine layer according the invention, in particular the ones with a film as substrate may be used as such, but can also be applied on plastic, paper, cardboard, and the like.

In one embodiment of the invention, the substrate with protected triazine layer is part of a packing for food and beverage products. Suitable food and beverage products include, but are not limited to coffee beans or milled coffee beans, beer, fruit juice, tomato ketchup, milk, cheese, prepared food and the like. The packaging can also be used for other products, such as for electrical components, personal care and pharmaceutical products.

In another embodiment of the invention, the substrate with protected triazine layer, optionally in a laminate, is used in or on displays or other electronic products. Displays can be either flexible or rigid. One example of an electronic flexible product is a flexible display. For example, on a rigid display (a display on a glass sheet), the substrate with protected triazine layer can be used to protect the OLED from oxygen attack.

The barrier properties and/or the adhesion of the triazine layer can improve if the substrate is treated first with a primer layer, corona or plasma treatment. As the primer various types of compounds can be used. Examples include UV curable monomers such a acrylates and epoxies and various types of thermoset resins such as epoxies, isocyanates or polyester based adhesives. The application of the primer can occur in-line (in the vacuum chamber) by first applying the primer, for example by vaporization, atomisation or CVD followed by deposition of the triazine compound, or off-line, i.e. applying the primer outside the vacuum chamber. The combination of in-line and off-line methods using different types of primers and adhesives is also possible. To achieve higher barrier properties, this process can be repeated many times to produce a composite structure consisting of the base substrate (for example PET), primer, triazine layer, primer, triazine layer, primer and so on.

The substrate film may consist of a homogeneous material, or it may itself be non-homogeneous or a composite material. The substrate film may comprise various layers. Preferably, the film comprises a polymeric material. Examples of polymeric compounds are thermoplastic compounds and thermosetting compounds. Suitable examples of thermoplastic compounds include polyolefins, polyolefin-copolymers, polyvinylalcohol, polystyrenes, polyesters and polyamides. Suitable examples of such polymers include HD or LD polyethylene (PE), LLD polyethylene, ethylene-propylene copolymers, ethylene-vinylacetate copolymer, polyproplylene (PP) and polyethylene terephtalate (PET). These thermoplastic compounds are often used in the form of a film, either as such or oriented; such orientation may be biaxial, such as for example biaxially oriented polypropylene film (BOPP), biaxially oriented polyethylene terephthalate (BOPET) and biaxially oriented polyamide film (BOPA). The film may also comprise a layer of paper.

The substrate with the protected crystalline triazine layer can be printed with methods known in the art such as for example flexography, gravure or letterpress printing. Suitable inks can be used, such as for example solvent based, water based or UV-curable inks. Printing can also be performed on the laminate.

The substrate with the crystalline melamine layer may be further processed into a laminate. The further lamination step can be done by applying an adhesive and a film, or can be done by direct extrusion lamination. As an adhesive, solvent based or water based adhesives or solventless systems can be used. In a preferred embodiment of the invention, the adhesive and protective coating are the same material. Examples of adhesives include various type of UV- or thermal curable resins based on acrylates, epoxies, isocyanates, polyester, and melamine formaldehyde resins.

In another embodiment of the invention, direct extrusion lamination is performed on the protected crystalline triazine layer at a relatively low temperature. A low temperature saves energy and improves barrier characteristics. Generally, extrusion lamination is performed at about 400° C. to oxidise the extruded film in order to improve adhesion in other systems. It appeared that such high temperature is not necessary, so, preferably, the extrusion lamination is performed at a temperature of about 300° C. or lower, even more preferable about 250° C. or lower, and most preferred about 200° C. or lower.

The substrate with crystalline triazine and protective compound according the invention has favorable barrier properties, for example a low oxygen transmission rate (OTR) and a low water vapor transmission rate (WVTR), and is sufficient wear resistant.

In another preferred embodiment of the invention, the laminate is used in a retortable packaging. This package is—with its final content—subjected to sterilizing conditions (for example slightly above 120° C. for 30 min up to for example 3 hr at 130° C. in a steam atmosphere). Such laminates require specific plastic films (as for example PE is not able to withstand these temperatures) and specific adhesives.

The OTR is generally measured in an atmosphere of 20-30° C. (for example 23° C.) and between 0% and 85% RH. The preferred values generally depends on the substrate. In case the substrate is biaxially oriented polypropylene (BOPP), the OTR generally will be about 400 cc/m$^2$·24 h·MPa or less, preferably about 300 cc/m²·24 h·MPa or less and even more preferred about 200 cc/m²·24 h·MPa or less. Generally, in case of BOPP, the OTR will be about 20 cc/m²·24 h·MPa or higher, and for example may be about 50 cc/m²·24 h·Pa or higher. The OTR can be measured with suitable apparatus, such as for example with an OXTRAN 2/20 manufactured by Modern Control Co. In case the substrate is a PET film, the OTR generally will be about 50 cc/m²·24 h·MPa or less, preferably about 30 cc/m²·24 h·MPa or less and even more preferred about 10 cc/m²·24 h·MPa or less. Generally, in case of PET, the OTR will be about 0.3 cc/m²·24 h·MPa or higher, and for example may be about 0.5 or 1 cc/m²·24 h·MPa or higher Water vapor permeability (WVTR) can be measured with a PERMATRAN 3/31 manufactured by Modern Control Co, in an atmosphere of 25-40° C. and between 50 and 90% RH. The preferred values will depend on the substrate. For example for BOPP the WVTR is generally about 3 g/m²·24 h or less, preferably about 2 g/m²·24 h or less, and more preferably about 1 g/m²·24 h or less. Generally, the vapor permeability will be about 0.1 g/m²·24 h or more, for example about 0.2 g/m²·24 h or more. For example for PET, the WVTR is generally about 8 g/m²·24 h or less, preferably about 7 g/m²·24 h or less, and more preferably about 4 g/m²·24 h or less. Generally, the vapor permeability will be about 0.5 g/m²·24 h or more, for example about 2 g/m²·24 h or more.

Preferably, the laminate has an OTR and WVTR also for other substrates which conforms to the values given in the former two paragraphs.

The substrate with protected crystalline triazine layer, optionally further processed by for example printing and laminating, can be applied as or to all kind of packing materials, for example paper, sheet and films. The packing material protects very well its content from for example oxygen, in this way increasing shelf life of for example food products or personal care products or protecting electronic components from oxygen attack.

In one embodiment, the laminate comprises a PET or BOPP film as substrate, a crystalline triazine layer as barrier layer and a protective coating. The laminate further comprising on the protected crystalline triazine layer a pattern or figure and optionally an adhesive and thereon a further film, which may be a polyolefin film, such as preferably a PE film. In another preferred embodiment, the polyolefin film has reverse printing instead of direct printing on the protected triazine layer.

In another embodiment of the present invention, the substrate is a plastic container made from thermoplastic polymer. Suitable thermoplastic polymers include polyesters, polyolefins and polyvinylchloride.

Plastic containers can be bottles, casks, kegs, bag-in box and other forms that can held liquid. Part of the content may be solid, like olives, cheese, onions, pickles, spices and citrus or other fruit. In a preferred embodiment of the present invention, the container is a bottle. In another embodiment of the invention, the container is a cask.

In one embodiment of the invention, the polymer is a thermoplastic polyester and optionally other polymers, wherein the polyester is present in at least 80 weight % of the thermoplastic material. The polyester preferably contains at least 80% polyethylene terephthalate; other polymers that may be blended with PET are polyethylene naphthalene, polyamide, polybutylene-terephthalate and the like. Preferably, the PET container consists of about 90% or more of PET. The PET container may be a monolayer bottle or a multilayer container. Multilayers preferably are used with recycled PET as an outer layer, and virgin PET as an inner layer.

In another embodiment of the present invention, the container is made from polymers based on naturally occurring material such as poly-lactic-acid polyester.

For example PET bottles can be prepared by injection moulding of pre-forms, and subsequent blow-forming the preform into an actual bottle-shape.

Containers from polyolefins include bottles, casks and other forms from preferably polyethylene or polypropylene. Such containers are generally made through blow moulding.

In another embodiment of the invention, bottles are made from polypropylene. PP is relatively inexpensive but has mechanical properties that make it a very suitable material for bottles. Furthermore, PP can be processed into bottles virtually as clear as PET bottles.

In yet another embodiment of the invention, containers are made from polyethylene. PE is even less expensive than PP and has also very good mechanical properties that make it a very useful material for containers like bottles. In one embodiment, it is preferred to use HDPE, as intrinsic barrier properties of HDPE are better than those of LDPE.

The containers as described above are holding the liquid. In one embodiment of the invention, the container is held—optionally in part—in a strengthening member. Suitable strengthening members include but are not limited to a box of carton or wood or on an additional bottom.

The containers with barrier properties can be used for food and beverages, personal care, pharmaceutical and other applications where such packaging can be used. The contents generally will be of fluid nature like beer, juice, oil or unguent. However, solid content like pharmaceuticals may need an oxygen barrier as well Containers may have a useful content of 0.05, or higher, such as 0.2 litre (L) or higher. Suitable examples of sizes include 0.05 L, 0.1 L, 0.2 L, 0.25 L, 0.33 L, 0.5 L. one pint, 1 L, 1.5 L, 2 L, 2.5 L, 3 L, one gallon, 5 L, 10 L and the like. Larger volumes may be suitable as well, and the upper limit is not critical. One could imagine casks, kegs or bag-in-box preferably for food service and industrial applications with sizes of 50 L, to 100 L up to 2000, 5000, 10,000 or 50,000 litre suitable to be used with beer, wine or liquid food ingredients.

In a preferred embodiment of the invention, the container is a bottle with a content of between 0.2-0.5 L, such as for example 0.2, 0.25, 0.33, 0.5 L or 1 pint. This content is particularly useful for single servings of beer, soft-drinks, fruit juice, wine and the like. Bottles of a size of for example 0.05 L, 0.1 L or more may be suitable for personal care applications such as for example crèmes, lotions and the like, for food products like small servings of ketchup and the like, for pharma applications, for small bottles with capsules, dragees, pills and the like.

In another preferred embodiment, the container is a bottle with a content of between 0.5 and 3 L, such as for example 0.75, 1, 1.5, 2, 2.5 or 3 L or the like. This content is particularly useful for multi-servings of beer, fruit juice, soft drinks, wine and the like.

In another preferred embodiment, the container is a relatively small cask, keg or bag-in-box with a content of 3 to 10 L, such as for example 3, 5, or 10 L, 1, 2 or 3 gallon and the like. This content is particularly useful for multi-servings of beer, wine, fruit juice or carbonized mineral water.

The crystalline triazine layer generally is deposited via vapour deposition. Melamine has a sublimation temperature at atmospheric pressure of about 350° C., which can be lowered to about 200-250° C. in vacuum. A triazine powder can be heated in an oven to the appropriate temperature to cause sublimation of the triazine. The substrate is at a temperature such that the triazine deposits (condensates) on the surface of the substrate. The triazine condenses as small crystallites, or grains.

The crystalline triazine layer may be present on the inside of the plastic container, or on the outside, or both.

The triazine layer preferably is directly applied on the surface of the container after its fabrication, and thereby constitutes the first layer on the plastic.

In one embodiment of the invention the plastic is treated by plasma treatment, corona treatment, UV radiation or electron beam to improve the adhesion between the plastic surface and the crystalline triazine. Preferably, a plasma treatment is applied.

In one embodiment of the invention, it may be useful to first deposit a layer of metal oxide, subsequently a layer of triazine, and subsequently a protective layer.

In another embodiment of the invention, it is preferred to first deposit a layer of crystalline triazine, and thereafter a further barrier or protective layer. Suitable further layers with barrier and/or protective properties include but are not limited to metal-oxide layers such as alumina oxide or silicium oxide, metal layers such as alumina or silver and organic layers.

The triazine layer preferably is applied in such an amount that the oxygen diffusion is lowered by a factor of about 6 or more in comparison to the uncoated bottle, preferably a factor of about 10 or more.

It is an advantage that the barrier properties of the crystalline triazine layer are not affected by heat stress and/or mechanical stress that is caused by heating a bottle to about 60° C. for about 20-30 minutes.

Crystalline melamine furthermore has as advantage that it is allowed in food-contact materials, and that a thin layer of melamine (<1000 nm) is completely transparent.

Furthermore, the crystalline triazine layer gives protection against UV light. This is in particular advantageous in applications where the bottle is transparent, like water-white, and yet the content is UV-light sensitive. Hence, in one embodiment of the invention, a crystalline triazine layer is used on a transparent plastic bottle with beer.

In case melamine is chosen for the crystalline triazine layer, the short wavelength UV is substantially blocked. On average a lowering is achieved of about 30% by an about 100 nm thin coating, of wavelengths between 320 and 360 nm. UV is measured as transmission. The PET film showed 90% transmission at wavelengths of 320 nm or higher. The melamine coated film showed a slope in the transmission from 50% at about 320 to 70% at 380 nm for a crystalline melamine layer of about 100 nm.

In one embodiment of the invention, the container is coated with sufficient melamine to achieve UV blocking properties such that on average about 30% or more of the light with a wavelength between 380 and 320 nm is blocked relative to the uncoated container, preferably such that on average about 40% or more is blocked, and most preferred that on average about 50% or more is blocked.

Furthermore, the crystalline triazine layer does not detoriate the mechanical integrity of the plastic-container, as may be the case for multi-layer systems where e.g. a non-PET film is in between two PET layers.

In a preferred embodiment of the invention, the outer coating of the bottle is a coating with functional properties. Suitable functional properties include but are not limited to UV barrier properties, water contact angles different from plastic and hardness higher than plastic.

In one embodiment of the invention, the coating has UV-light blocking characteristics such that, together with the blocking characteristics of the crystalline triazine layer, the content receives about 50% or less of average UV light over a wavelength between 380 and 310 nm in comparison to a non-coated bottle. Preferably, the UV blocking properties are such that the content receives about 30% or less of average UV light, most preferred about 10% or less. Because the triazine barrier layer already exhibits certain UV-light blocking properties, the requirement for the UV blocking properties of the further coating may be less stringent than for a container without a melamine barrier coating. Suitable UV-blocking properties can be achieved by adding UV-absorbers to the further coating.

In another embodiment, the further coating has anti-fouling properties, as to keep the bottles more clean and prevent bio-fouling. Such anti fouling properties can be achieved by using hydrophilic coatings, such as those based on polythyleneglycol oligomers, hydroxyethylmethacrylate based polymers, poly-vinylpyrrolidone polymers and the like. It is preferred that the static contact angle of water of such a coating is about 30° or less.

The contact angle and roll-off angle can be measured with deionized water on a Dataphysics OCA 30 instrument at room temperature (~21° C.). The contact angles and roll-off angles are determined by averaging values measured at three different points on each sample surface. Dynamic advancing and receding angles can be recorded while the probe liquid is added to and withdrawn from the drop, respectively.

In another embodiment of the invention, the outer coating exhibits such properties as to resemble glass articles. It is for example preferred to have a coating with more hydrophobic properties (but less hydrophobic than the anti-fouling coatings described above). Preferably, the hydrophobic properties are such that a cold bottle exhibits the formation of water droplets in warm humid environments resembling a glass bottle. In this embodiment, the static contact angle of water on the coating is preferable about 30° or higher, and about 90° or lower. More preferred, the coating exhibits a static contact angle of about 40° or higher. Such a contact angle can be achieved with using hydrophobic coatings, for example comprising polypropyleneglycol or polyesters with partly ethyleneglycol or hydroxy side chains.

In yet another embodiment, strongly hydrophobic coatings may be of advantage. PP has a static contact angle of about 100. It may be of advantage to have higher angles, such as for example about 112 by using PTFE, or even higher with the use of some fluorinated compounds, silicone-oligomers and the like.

In a further preferred embodiment, the coating has water barrier properties, protecting the crystalline triazine layer from direct water contact.

The further coatings may be applied through spraying, dip coating, atomizing and the like, and thereafter dried or cured by heating, cooling, radiation or otherwise. The description of the coatings hereinbelow is specifically suitable for coatings on containers, but the teaching is also useful for the protective coating on films.

In one embodiment, the coating is a radiation curable coating having at least one acrylate functional compound. Suitable radiation curable coatings may be soft or hard, and may be multilayered. Examples of suitable coatings are coatings comprising (a) an oligomer with at least one radiation curable group (b) a reactive diluent with at least one radiation curable group (c) optionally, one or more photoinitiators.

The oligomer can be a urethane acrylate oligomer comprising a backbone oligomer which can be for example a polyester, polyether, polyolefin or polycarbonate. Polyether or polyester type backbones are preferred. The oligomer can be an acrylated acrylic, polyester or polyether. Urethane based oligomers generally give tougher coatings.

Generally, the oligomer will have an average theoretical molecular weight of about 500 or higher. The oligomer generally causes flexibility of the coating.

Below some examples of curable compositions are given. It will be understood by the skilled man, that this teaching can be used separately and in combination.

The reactive diluent may be monofunctional or polyfunctional, and the diluent will have a molecular weight of about 500 or less.

A radiation-curable soft coating compositions generally may comprise,
(a) 20-98 wt % of at least one oligomer having a molecular weight of about 1000 or higher, preferably, 20-80 wt %, more preferably, 30-70 wt %,
(b) 0-80 wt % of one or more reactive diluents, preferably, 5-70 wt %, more preferably, 10-60 wt %, most preferably, 15-60 wt %,
(c) 0.1-20 wt % of one or more photo-initiators for initiation of a radical polymerisation reaction, preferably, 0.5-15 wt %, more preferably, 1-10 wt %, most preferably, 2-8 wt %,
(d) 0-5 wt % of additives.

Preferably, the oligomer (a) is a urethane (meth)acrylate oligomer, comprising a (meth)acrylate group, urethane groups and a backbone. (Meth)acrylate includes acrylate as well as methacrylate functionality. The backbone is derived from a polyol which has been reacted with a polyisocyanate and a hydroxyl group containing (meth)acrylate. However, urethane-free ethylenically unsaturated oligomers may also be used.

The viscosity of the liquid curable resin compositions is preferably from 0.1 to 100 Pa·s/25° C., more preferably from 0.2 to 50 Pa·s/25° C., still more preferably from 0.45 to 40 Pa·s/25° C. and particularly preferably from 1.0 to 15 Pa·s/25° C.

Preferably, the Young's modulus at 23° C. of the cured product obtained by curing the liquid curable resin composition using radiation or heat is preferably from 1 to 250 kg/mm$^2$ for secondary coatings, ribbon matrix materials, bundling materials and ink coatings, more preferable from 10 to 200 kg/mm$^2$ and particularly preferably from 20 to 150 kg/mm$^2$. When the composition is used as a ribbon matrix material or a bundling matrix material for optical fibers, the Young's modulus of the composition after cure is normally about 10-200 kg/mm$^2$, and preferably about 20-150 kg/mm$^2$.

Elongation and tensile strength of these materials can also be optimized depending on the design criteria for a particular use. For cured coatings formed from radiation-curable compositions formulated for use as protective coatings on bottles, the elongation-at-break is typically between 6% and 100%, and preferably higher than 10% and more preferred higher than about 15%.

The tensile strength of the protective coatings preferably is between 10 and 100 MPa, more preferred between 20 and 60 MPa and particularly preferred between 25 and 50 MPa.

The glass transition temperature ($T_g$), measured as the peak tan-delta determined by dynamic mechanical analysis (DMA), can be optimized depending on the particulars of the application. The glass transition temperature may be from 10° C. to 150° C. or higher, more preferably above 30° C., for compositions designed for use as protective coating. The protective coating preferably has a $T_g$ of at least about 40° C. and particularly preferable at least about 60° C.

In another embodiment of the invention, the protective coating is a hydroxyl or acid functional polyester. The coating comprising the functional polyester. It is an adanvage that the polyester coating withstands pasteurisation and has very good mechanical properties. Furthermore, such coating may be approved for food applications (according to FDA paragraph 175300 or Directive 90/128/EEC and amendments), and/or a good adhesion of the coating composition and the coating on the substrate.

Polyesters suitable for the coating composition can be made by several methods for preparing polyesters known to the person skilled in the art. Methods for preparing polyesters are for example described in Brock et. al. 'European Coatings Handbook', 2000, Vincentz Verlag, pg 53-58. For example, the polyesters can be produced by an esterification reaction between poly-functional alcohols and poly-functional acids and/or poly-functional acid anhydrides. The type of monomers to be used to prepare the polyesters can be selected by the person skilled in the art depending on the desired use.

In one embodiment of the invention, the polyesters suitable for the coating composition preferably are based on at least 80 weight % of aromatic acids and/or aromatic acid anhydrides (based on the total weight of acid and acid anhydride monomers used). According to a preferred embodiment of the invention more than 90 weight % aromatic acids and/or aromatic acid anhydrides is used, preferably more than 95 weight %, more preferably between 97 and 100 weight %, even more preferably between 99 and 100 weight % and most preferably 100 weight %.

The polyesters suitable for the coating composition of the invention have to be cured with a crosslinker or a mixture of crosslinkers. The crosslinker or mixture of crosslinkers may be selected depending on the desired use. The person skilled in the art can easily determine the (mixture of) crosslinker(s) most suitable for the desired use.

The coating composition preferably comprises at least one phenolic based crosslinker. Suitable phenolic based crosslinkers are, for example, curable unplasticized epoxidized phenolic resins, n-butylated phenolic resin, non-etherified epoxidized phenolic resin.

Another crosslinker or a mixture of other crosslinkers may be added to the coating composition optionally in combination with a phenolic based crosslinker or a mixture of phenolic based crosslinkers. Preferably the other crosslinker comprises at least an carboxy-anhydride crosslinker.

In a preferred embodiment of the invention, the curing takes place at a temperature of about 100° C. or lower, preferably at a temperature of about 80° C. or lower and most preferred of about 60° C. or lower. In a preferred embodiment of the invention a radiation sensitive initiator is used to initiate the curing. Acid or base functional photoinitiators are known and suitable for such purpose.

In a preferred embodiment of the invention, at least one of the UV blocking, (photo)initiating and/or other additives are part of a polymeric structure to limit diffusion to the food, and would allow food contact of the coating itself.

In one embodiment of the invention, a PP or PE container is coated with sufficient triazine and at least one further layer that improves barrier properties such that the coated PP or PE container has better barrier properties than a comparable (non-coated) single layer container made from PET The coated container according the invention has favorable barrier properties, for example a low oxygen transmission rate (OTR) and a low carbondioxide transmission rate, and is sufficient wear resistant. Therefore, the coated bottle of the invention can be made suitable for printing The OTR is generally measured in an atmosphere of 23° C. and 0% or 70% RH. The OTR can be measured with suitable apparatus, such as for example with an OXTRAN 2/22 manufactured by Modern Control Co. In case the substrate is a three dimensional form like a bottle, the OTR generally is reported as a dimensionless improvement factor, Barrier Improvement Factor (BIF). A plastic container like a bottle is glued with its opening on an gas inlet, and a glass bottle or container is put over the plastic bottle to create a closed cavity outside the bottle, which cavity has a gas inlet and outlet. In the present case, the inside of the bottle was filled with hydrogen/nitrogen gas, and the outside was filled with pure oxygen (99.99995%). Measurements were performed for about 7 days. The Barrier Improvement Factor achieved with the bottles according the invention, preferably is about 6 or higher, more preferably the BIF is about 10 or higher, most preferred about 13 or higher.

Carbon-dioxide permeability can be measured in an analogous way. As a rule of thumb, the carbon-dioxide transmission is one fourth of the oxygen transmission. Hence, as a first approximation, it is possible to use the absolute value of the oxygen transmission, and divide that by four.

Vapour-depositing a triazine like melamine is for example described in U.S. Pat. No. 6,632,519 for continuous films.

The present invention also relates to an apparatus for coating containers with a crystalline triazine layer, in which a container is held and enclosed in a vacuum chamber, which chamber can be depressurized to 1 mbar or less, and which further comprises a crucible suitable for triazine evaporation.

In the present case, the containers are preferably processed in a semi-batch process.

According to a process of the present invention, one or more containers are brought into a chamber, which chamber is closed, and vacuum is applied to 1 mbar or lower, and thereafter, one or more coatings are deposited, at least one of the coatings being a crystalline triazine layer. Suitable examples of coating layers comprise for example first a melamine coating, and thereafter a silicium-oxide coating via CVD or parylene coating. Preferably, the coating material inlets can be closed during the time that these coatings are not applied.

In case the inside of a bottle has to be coated, this can be done through the opening of the bottle. For casks, it is preferred to coat the inside of the cask before manufacturing the valve or tap.

Hence, the apparatus of the present invention further comprises pipes which can be brought close to an opening of a container that is to be coated.

In case the outside of the bottle is coated, the apparatus according the present invention preferably comprises two or more crucibles to heat materials for deposition.

Films with a layer of crystalline triazine and a process for making such layer is described in WO2004/101662. In WO2004/101662 a process is described wherein in a vapor deposition step a triazine compound, preferably melamine, is deposited on a substrate, at reduced pressure, the temperature of the substrate being below the temperature of the vaporized triazine. WO2004/101662 suggests that prior to or during the vapour-depositing step, the substrate may be treated with plasma, corona, UV radiation, electron beam, or a reactive gas such as water in order to create reactive groups on the surface of the substrate, and thereby improve the adhesion of the layer to the substrate.

Preferably, the substrate is kept at a temperature of about 50° C. or lower. In case the triazine is used as single barrier layer, this objective is fairly easy to achieve, because the triazine is not heated to a very high temperature (like Al or metal-oxides)

Vapour-depositing as such is a process known to the skilled person. As is known, a vapour-depositing step is often carried out at a reduced pressure, i.e. a pressure below atmospheric pressure. In the process according to the invention, the pressure preferably is below about 1000 Pa, preferably below about 100 Pa even more preferably below about 1 Pa, more preferably below about $1 \times 10^{-2}$ Pa. Although lower pressures can be used, it is an advantage of the present invention, that higher vacuum is not needed. This has as an advantage, that sufficient vacuum can be achieved with oil pumps, and that it is not necessary to use diffusion pumps.

A layer of crystalline triazine, without metal or metal-oxide layer has the further advantage, that the application is done at relatively low temperature. The triazine evaporates at 300-400° C., whereas the metal or metal-oxides use temperatures in excess of 1000° C. This has as advantage that temperature sensitive substrates as polyethylene can be used, and that substrates like polypropylene do not need special additives.

During the vapour-depositing step, the temperature of the substrate is preferable about −20° C. or higher, and most preferable about −15° C. or higher. The temperature of the substrate generally will be about +125° C. or lower, preferably about +100° C. or lower, even more preferably about +80° C. or lower, and most preferably about 30° C. or lower. The temperature of the substrate is defined herein as the temperature of the part of the substrate that is not being vapour-deposited. For example, if the vapour-depositing step is done on a film which is guided over a temperature-controlled coating drum, the temperature of the substrate is the temperature at which the coating drum is controlled, thus the temperature of the surface section of the film that is in immediate contact with the coating drum. In such a case, and in view of the fact that the to be deposited compounds often have a much higher temperature than 125° C., it will typically occur—as is known—that the temperature of the side of the substrate that is being deposited is higher than the temperature of the side that is not being deposited.

Methods to ensure that the substrate has a defined temperature are, as such, known. One such a known method of ensuring that the substrate has a defined temperature is applicable in case there is at least one section, plane or side of the substrate where no layer is to be vapour-deposited; the said section, plane or side can then be brought into contact with a cooled or heated surface to bring the temperature to a desired level and keep it there. As an example, it is known that in case the substrate is a film and the vapour-depositing step is executed as a semi-continuous or continuous process whereby the layer will be deposited on one side of the film, the said film can be guided over a temperature-controlled roll, also known as coating drum, in such a fashion that the other side of the film—where no layer will be deposited—is in contact with the temperature-controlled roll before and/or during and/or following the vapour-depositing step.

One of the effects of the temperature difference between the melamine vapour and the substrate, combined with the number of nucleation points, is that the grain size of the crystalline melamine layer can be influenced. The grain size can also be changed by pressure; the lower pressure the smaller the grain size or melamine flux, i.e. the amount of vaporised melamine, more melamine giving smaller grains. Furthermore, the grain size can be influenced by continuous (role-to-role) or static deposition on the substrate, and the evaporator design. In a preferred embodiment of the invention, the deposition process is affected in such a way that the grain size of the crystalline melamine layer is relatively large, as that improves in particular the barrier characteristics under humid conditions. Preferably the grain size is about 200 nm or larger, more preferably about 300 nm or larger. For example, the grains are about 400 nm or larger in average diameter. Generally, the grains will be about 1000 nm or smaller, preferably about 700 nm or smaller, as that allows faster processing.

The invention will be further elucidated with the following non-limiting examples.

EXAMPLES I-V AND COMPARATIVE EXPERIMENTS A-C

The following coating compositions were made by mixing the components as shown in Table 1; amounts in parts by weight

TABLE 1

| Component | Coating 1 | Coating 2 | Coating 3 | Coating 4 |
|---|---|---|---|---|
| Polyester Uralac SN859 | 35.7 | 42.4 | 40.1 | |
| Polyester Uralac SN820 | | | | 35.7 |
| Cymel 325 (as 100% solid) | 11.6 | 5.1 | 2.4 | 11.6 |
| Tolonate IDT (IPDI, as 100% solid) | | | 4.8 | |
| CAB 551.02 | 0.3 | 0.3 | 0.3 | 0.3 |
| Nacure 2500 | 0.4 | 0.4 | 0.4 | 0.4 |
| Sovent naphta 100 | 29 | 29 | 29 | 29 |
| Sovent naphta 150D | 28.6 | 33.9 | 32.0 | |
| Xylene/ethylbenzene | | | | 15.3 |
| Isopropanol | 0.6 | 0.6 | 0.6 | 0.6 |
| Isobutanol | 2.9 | 1.3 | 0.6 | 2.9 |
| Butylglycol | 10.4 | 11.8 | 11.3 | 3.3 |
| Solvent of tolonate | | | 2.0 | |
| Appearance | clear | clear | Slightly hazy | Clear |

Uralac SN 859 and Uralac SN 820 are polyesters of DSM Resins, having an OH-value of about 50, an Mw of about 5000. Uralac SN 859 has a Tg of about 70° C., Uralac SN 820 has a Tg of about 7° C.
CAB 551 is a wetting agent
Nacure 2500 is an acid curing catalysts.

A PET-film (Melinex S) of 23 µm thickness was coated with a continuous layer of crystalline melamine in a box coater by vapor depositing melamine, which was heated till 250° C. at a pressure of about $5*10^{-5}$ mBar. Thereafter, the coating was applied by roll-coating. The thickness of the coating was about 4 µm. Results are summarized in table 2.

TABLE 2

| Example | Time of melamine deposition | Coating composition | Tape test | OTR At 0% RH | OTR At 85% RH | Remarks |
|---|---|---|---|---|---|---|
| I | 2 sec | 1 | good | 2.1 | 2.6 | |
| II | 2 sec | 2 | good | 2.3 | 7.5 | |
| III | 2 sec | 3 | good | 1.3 | 19.2 | Dual cure |
| IV | 20 sec | 1 | reasonable | 1.2 | 1.3 | Thicker layer of melamine |
| V | 2 | 4 | good | 0.5 | 1.5 | |
| A | — | — | — | 65.5 | 50.2 | Bare PET |
| B | — | 1 | good | 65.7 | 46.9 | Only coating composition |
| C | 2 | — | — | 4.4 | 43.8 | Only melamine |

The tape test was done by making a cross-hatch of 5*5 mm, and determining whether with Scotch tape any squares were removed. Good means none removed.

The OTR was measured with an OXTRAN 2/20 manufactured by Modern Control Co, according to their manual. The values given are the steady state values (generally) after 48 hr. The measurements were done at 23° C. The OTR is expressed as cc per $m^2$ per 24 hr.

The experiments show, that a bare PET film has an oxygen transmission of about 65 (Exp A), which OTR is not influenced by the coating comprising a melamine resin (Exp B). Applying a crystalline melamine layer does improve the OTR substantially (by a factor of over 14) (Exp C), but at high humidity, the good barrier properties disappear. As is clear from the examples, the crystalline melamine layer with a protective compound is suitable for good oxygen barrier even at 85% RH, which makes this barrier film suitable for transparent packaging.

The films of Examples I and IV were also measured at 40° C. and 85% RH. The OTR values measured were for Example I: 2.0 cc per $m^2$ per 24 hr, and for Example IV 1.1 cc per $m^2$ per 24 hr. So, the film with barrier properties even has a lower OTR value at higher temperature.

EXAMPLES VI-XII AND COMPARATIVE EXPERIMENT D

Bottles were coated on the inside in laboratory equipment comprising a vacuum chamber, an oven with an opening, or a small pipe (2 cm diameter; 2 cm height), the opening or pipe had a valve which was opened when the temperature of the oven was about 290-310° C. (as is shown in the table) to achieve a substantial and continuous stream of melamine to the substrate. As furthermore shown in the table, the pipe could be extended such that the pipe was about 10 cm long, and could be placed substantially inside a bottle.

Fresh bottles of 1.5 l straight PET were used.

Each bottle separately was brought into the vacuum chamber, and a vacuum was applied down to about 2-5 $10^{-5}$ mbar.

The melamine was heated in the oven, which generally took about 4-5 min. After opening the closure, the bottle was coated for a time as given in table 3. In examples XI and XII, the bottles were moved over the pipe in 2 cm increments.

The coated bottles were tested for oxygen transmission of pure oxygen at the outside of the bottle, measuring the transmission with inside hydrogen/nitrogen at 0% relative humidity for 160-190 hr. Results are summarized in table 3.

TABLE 3

| Exp | Tube on oven | Start Temp Coating (° C.) | Coating time | Cc/ package/ Day | Test time (hr) | Barrier improvement factor |
|---|---|---|---|---|---|---|
| VI | No | 290 | 2 m 30 s | 0.0126 | 167 | 17 |
| VII | No | 290 | 2 m 25 s | 0.0198 | 190 | 11 |
| VIII | No | 290 | 1 m 30 s | 0.0195 | 190 | 11 |
| IX | 2 cm | 310 | 2 m 00 s | 0.0189 | 162 | 11 |
| X | 2 cm | 310 | 1 m 00 s | 0.0342 | 160 | 6 |
| XI | 10 cm | 310 | 2 m 10 s | 0.0166 | 166 | 13 |
| XII | 10 cm | 310 | 1 m 40 s | 0.0199 | 166 | 11 |
| D | — | — | — | 0.2094 | 162 | — |

The barrier properties can be further improved with applying a ultra thin glass coating on the inside of the coated bottle.

Comparable results can be obtained with coating the outside of the bottles, when proper protection against wear is imposed by coating the melamine layer.

COMPARATIVE EXPERIMENTS E-F

Model experiments were performed to determine the humidity resistance of a crystalline melamine barrier film. PET films of 75 μm were coated with a 100 nm thin crystalline melamine layer. OTR measurements were performed in dry atmosphere (0% relative humidity (RH)), and moist atmosphere (85% RH), both at 22° C. Also, after measurement in moist atmosphere, a further experiment was performed, again at dry atmosphere. Results are summarized in table 2.

TABLE 2

| Experiment | E | F |
|---|---|---|
| OTR in cc · mm/m2 · day | PET | PET-melamine |
| OTR at 0% RH | 1.5 | 0.4 |
| OTR at 85% RH | 1.3 | 1.25 |
| OTR at 0% RH, after 85% treatment | 1.55 | 0.5 |

As is clear from these experiments, unprotected melamine looses its oxygen barrier properties at high humidity. However, the barrier properties are regained after drying, showing that the crystalline triazine layer keeps its integrity.

EXAMPLES XIII-XIV

PET melamine films are coated, one with a UV curable HMMM-acrylate resin with a tensile strength of 50 MPa at 20° C. and a Tg of 65° C., and another with a UV curable melamine resin comprising a Bisphenol-A-diacrylate resin. A post-cure is applied by leaving the films for 12 hr at 60° C. The OTR measured under dry and humid conditions are compared. In all three circumstances virtually the same OTR's is measured, for both protected systems. Hence, the coatings were able to protect the barrier properties of the crystalline melamine layer against moisture. For example, EVOH barrier layers are very moist sensitive above 80% RH.

The invention claimed is:

1. A substrate comprising a layer of crystalline triazine with a protective compound having a retention of oxygen barrier at 85% RH of about 50% or better, wherein the protective compound is a resin composition having, when applied, a viscosity at 23° C. between about 0.1 Pa·s and 50 Pa·s.

2. The substrate according to claim 1, wherein the triazine layer causes a reduction in OTR of about ⅓ or better of the OTR without triazine barrier layer measured at 0% RH.

3. The substrate according to claim 1, wherein the retention of oxygen barrier at 85% RH is about 80% or better.

4. The substrate according to claim 1 further comprising a cured azine-formaldehyde or phenol-formaldehyde resin.

5. The substrate according to claim 1, wherein the crystalline triazine layer is a crystalline melamine layer.

6. The substrate according to claim 1, wherein the substrate is a plastic film or container of plastic material.

7. The substrate according to claim 1, wherein the substrate further comprises a layer of metal or metal oxide.

8. A laminate comprising a substrate according to claim 1 and a further plastic film.

9. A food packaging which comprises the substrate according to claim 1.

10. A pharmaceutical packaging which comprises the substrate e according to claim 1.

11. The substrate according to claim 1, wherein the layer of crystalline triazine is a continuous layer of crystalline melamine, and wherein the substrate further comprises a coating comprising a crystalline-triazine reactive compound and a film forming compound.

12. The substrate according to claim 11, wherein the triazine reactive compound comprises an azine-formaldehyde or phenol-formaldehyde resin.

13. The substrate according to claim 11, wherein the protective compound or the triazine reactive compound comprises a melamine or urea resin.

* * * * *